United States Patent [19]

Antesberger

[11] Patent Number: 5,798,862
[45] Date of Patent: Aug. 25, 1998

[54] VIEWING DEVICE ADAPTOR AND INSERT FOR A VEHICLE

[75] Inventor: Edward A. Antesberger, Fairfax, Va.

[73] Assignee: The United States of America as represented by the Secretary of the Army, Washington, D.C.

[21] Appl. No.: 427,934

[22] Filed: Apr. 26, 1995

[51] Int. Cl.$^6$ .......................... G20B 7/00; G20B 7/182; G20B 5/08; B60J 7/043
[52] U.S. Cl. .......................... 359/503; 359/405; 359/862; 359/871; 359/896; 296/216
[58] Field of Search .......................... 359/405, 406, 359/503, 811, 819, 862, 879, 880, 881, 896; 280/35; 296/37.7, 216; 348/118

[56] References Cited

U.S. PATENT DOCUMENTS

| | | | |
|---|---|---|---|
| 1,939,311 | 12/1933 | Mort | 359/862 |
| 3,888,563 | 6/1975 | Dierkes | 359/405 |
| 4,161,352 | 7/1979 | Felix et al. | 359/862 |
| 4,802,752 | 2/1989 | Auglin | 359/871 |
| 5,137,327 | 8/1992 | Edmonds et al. | 296/224 |

Primary Examiner—Paul M. Dzierzynski
Assistant Examiner—Audrey Chang
Attorney, Agent, or Firm—Milton W. Lee; John E. Holford; Alain L. Bashore

[57] ABSTRACT

A viewing device adaptor, hatch insert, and overall mounting system allows a viewing device to be releasably mounted through an existing vehicle opening of a vehicle. The viewing device includes a mounted periscope assembly extending from a body of a viewing device, with a collar bearing surface contiguous inbetween. A viewer adaptor releasably and rotatively mounts about the collar bearing surface. A hatch insert releasably mountable within a vehicle hatch opening including an opening for the releasable mounting of the viewer adaptor therewithin. When the viewing device adaptor is coupled about the collar bearing surface, and releasably mounted within the hatch insert that has been releasably mounted within the hatch opening, there results a substantially unobstructed field of view, with the viewing device within the vehicle rotatable from inside the vehicle.

3 Claims, 7 Drawing Sheets

FIG. 9

VIEWING DEVICE ADAPTOR AND INSERT FOR A VEHICLE

BACKGROUND OF THE INVENTION

1. Field of the Invention

The present invention generally relates to adapters and mounting systems and more specifically, to an adaptor and mounting system that allow a sensing device to be mounted into the existing opening of a vehicle hatch of a vehicle capable of withstanding a hostile environment.

2. Description of Prior Art

The mounting system of a viewing device generally must support the optics utilized to the required precision, be able to point to and track the object being observed, and support the viewing device in accessible positions. When the viewing device is supported and pointed by the user, the user is considered the "mounting". But when the user is in a vehicle, the difficulty of utilizing a hand held viewing device is greatly increased, practically impossible if the user is also driving. Most viewing devices on vehicles are usually mounted to allow vehicle occupants greater freedom of movement.

Mounting systems in vehicles that must at times operate in hazardous conditions pose greater design difficulties than for the average vehicle. Vehicle wall strength and overall design of the vehicle require a minimum of access points by which the vehicle can be vulnerable. The operator must be increasingly aware of his surroundings at all times, depending on the nature of the hazardous environment the vehicle is traversing. The device must be readily accessible to the driver or occupant, which limits the mounting space and its positioning within the vehicle to occupy "non-critical space". The device and its mounting system must be readily removable from each other, and each also from the vehicle. The physical protrusion outside the vehicle is also kept to a minimum, but must allow the user an unobstructed field-of-view (FOV). One type of vehicle that must at times traverse a hostile environment is the military "track" vehicle. Some presently fielded viewers have yet to be mounted on military vehicles of these types. Another type of vehicle is the underwater submersible that must at times traverse underwater at deep underwater pressures.

While the prior art has reported using mounting systems for military vehicles none have established a basis for a specific apparatus that is dedicated to the task of resolving the particular problem at hand.

What is needed in this instance is an adaptor and mounting system that allows a viewing device to be mounted into the existing vehicle opening of a vehicle that must travel in a hostile environment, allow a substantially unobstructed FOV, allow the viewing device to occupy non-critical space within the vehicle, and be readily removable.

SUMMARY OF THE INVENTION

It is therefore one object of the invention to provide a mounting system that allows a viewing device to be removably mounted through a vehicle opening normally within the roof of a vehicle, allow a substantially unobstructed FOV, and allow the viewing device within the vehicle to occupy non-critical space.

Another object of the invention is to provide a hatch insert for releasably mounting a viewer adaptor within a hatch opening.

Another object of the invention is to provide a viewer adaptor specifically that allows for releasably mounting a viewing device into a hatch insert.

According to the invention, there is disclosed a mounting system that allows a viewing device to be releasably mounted therethrough an existing vehicle opening of a vehicle. The viewing device includes a mounted periscope assembly extending from a body of a viewing device, with a collar bearing surface contiguous inbetween. A viewer adaptor releasably and rotatively mounts about the collar bearing surface. A hatch insert releasably mountable within a vehicle hatch opening includes an opening for the releasable mounting of the viewer adaptor therewithin. When the viewing device adaptor is coupled about the collar bearing surface, and releasably mounted within the hatch insert that has been releasably mounted within the hatch opening, results in allowing a substantially unobstructed field of view, with the viewing device within the vehicle rotatable from inside the vehicle.

The hatch insert further includes a circular outer periphery which approximates the periphery of the vehicle hatch opening, and an inner periphery which approximates the periphery of a viewing device adaptor. Means releasably couple the circular outer periphery to the periphery of the vehicle hatch opening. Another means positions and stabilizes the viewer device adaptor within the inner periphery. Another means releasably couples the viewer device adaptor to the inner periphery, thereby allowing a viewer adaptor to be releasably coupled and positionally set within the hatch insert opening.

The viewer adaptor further includes two half sections, each section semi-circular shaped. Means releasably couples the two half sections, thereby allowing the two halfs of the viewer adaptor to be releasably coupled about the collar bearing surface of the viewing device, and when the viewer adaptor is coupled, is rotatable about the collar bearing surface.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Military vehicles, especially combat types, must be able to function in a totally enclosed condition in a hostile environment. An aperture or apertures are necessary to provide a means to observe outside conditions. This is accomplished through the use of periscopes or vision blocks for the crew, especially the commander and driver. These periscopes may be daylight or night vision types. In a "buttoned up" condition a crew must be able to escape or return fire to an enemy.

Figure 1:
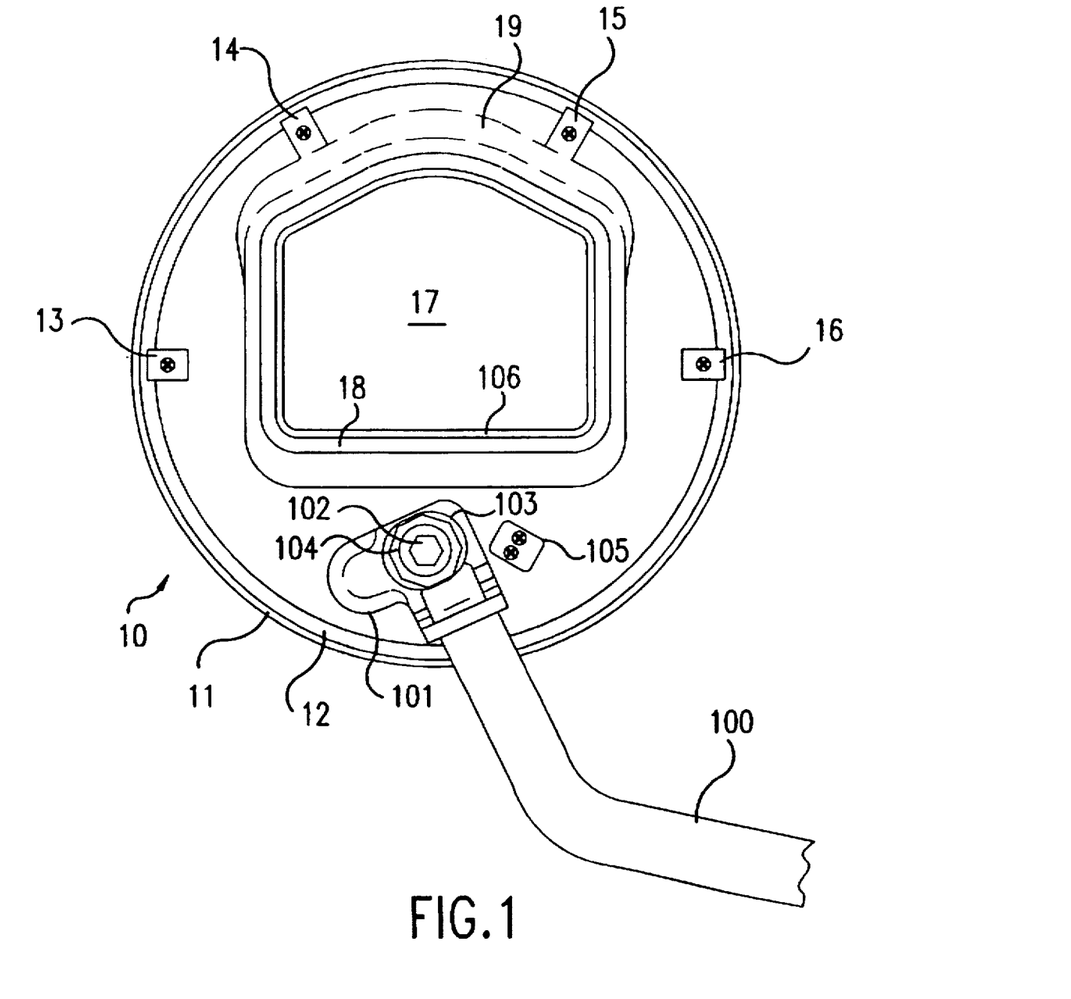
FIG. 1 is a bottom view of the hatch insert.

Referring now to the drawings, and more particularly to FIG. 1, there is shown a bottom view of hatch insert 10 of the present invention. Hatch insert 10 includes first locating shoulder 11 and second locating shoulder 12 both of which facilitate the positioning of hatch 10 within an opening of a vehicular hatch cover. Hold-down clamps 13 through 16, which are bolted to hatch insert 10 as shown in FIG. 1, allow the positioned hatch insert to be held in place within the opening and permit positioning azimuth location of the insert. An extension of the clamp captures the hatch and the tightness of the bolt determines the tightness of the insert.

Opening 17 is present in hatch insert 10 to allows for placement of a viewing device adaptor. 0-ring seal groove 18 allows for placement of an O-ring so that a weather seal is effected with placement of the viewing device adaptor within aperture 17. Latching space 19 shown in phantom along the top of aperture 17 is an interior space within the hatch insert which allows for the receipt of front support flanges of the viewing device adaptor to be described later.

The viewing device adaptor may then be releasably latched in place by manual movement of latch handle 100 shown in FIG. 1, so that latch 101 will pivot about socket head screw 102, bearing washer 103 and latch adjust eccentric 104, resulting in latch 101 is releasably held against the back of the inserted viewing device adaptor. Latch stop 105 provides a surface for latch 101 to stop against in the extreme position when locked. Depression 106 provides a securing position for the latching surface flange of the viewer adaptor to be described later.

Figure 2:
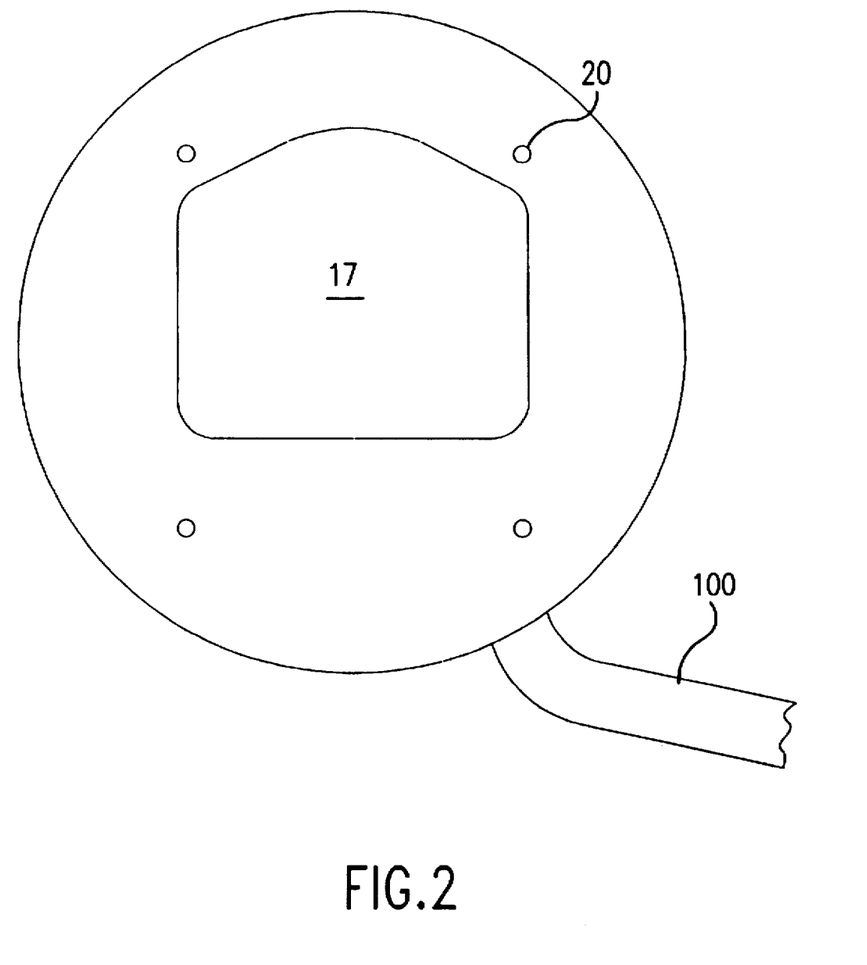
FIG. 2 is a top view of the hatch insert shown in FIG. 1.
Figure 3:
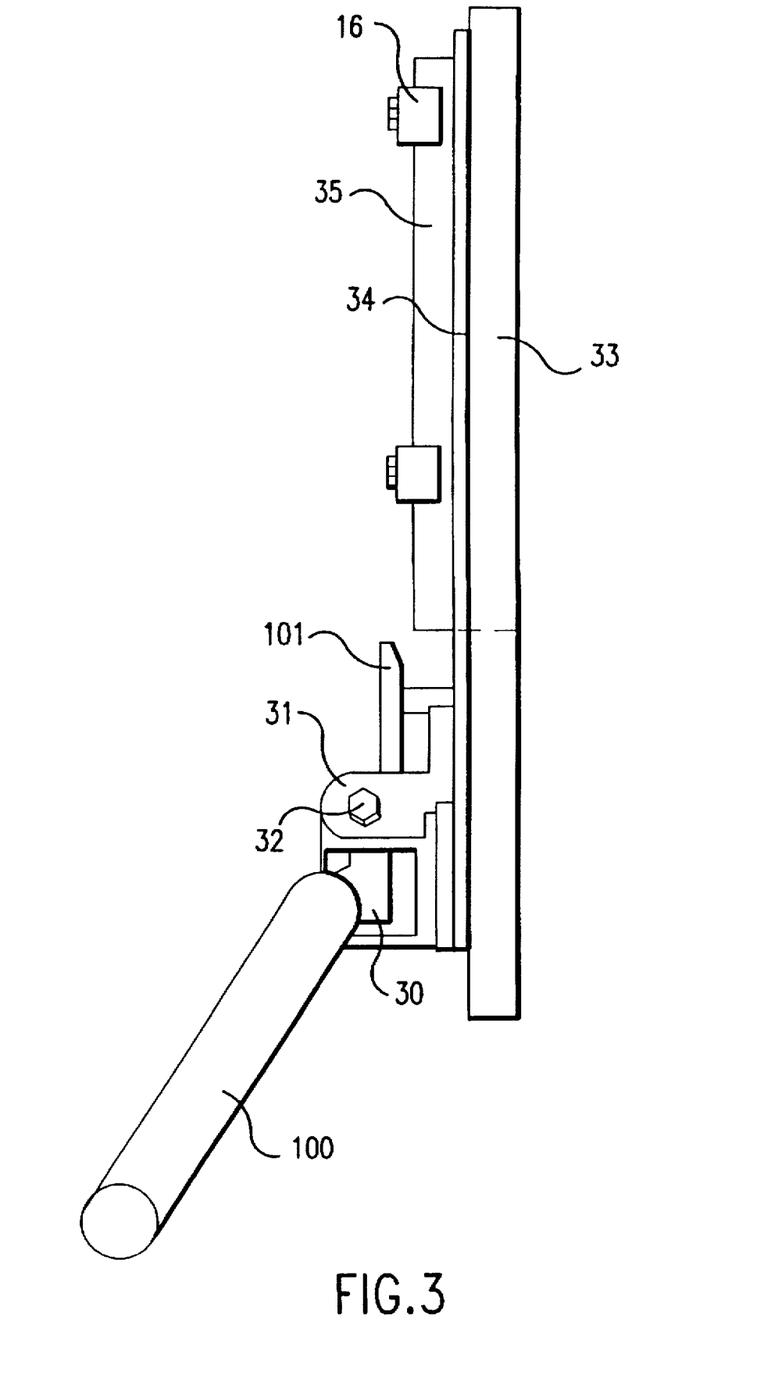
FIG. 3 is a rear view of the hatch insert shown in FIG. 1.

FIG. 2 is a top view of hatch insert 10 shown in FIG. 1. The side shown in FIG. 2 faces the outside environment when inserted in place within the vehicle hatch opening. Ballistic Shield mounting holes 20 are utilized for mounting a ballistic shield that protects the viewing device which extends outside of the hatch cover. FIG. 3 is a side view of the hatch insert shown in FIG. 1. Latch handle 100 includes on a forward end a latch handle positioning pivot part 30 which is adjustable within latch handle mount 31 by the adjustment of positioning bolt 32. This adjustment allows the positioning in space of latch handle 100 so that as the handle is manually utilized it occupies a desired space underneath the hatch.

Figure 4:
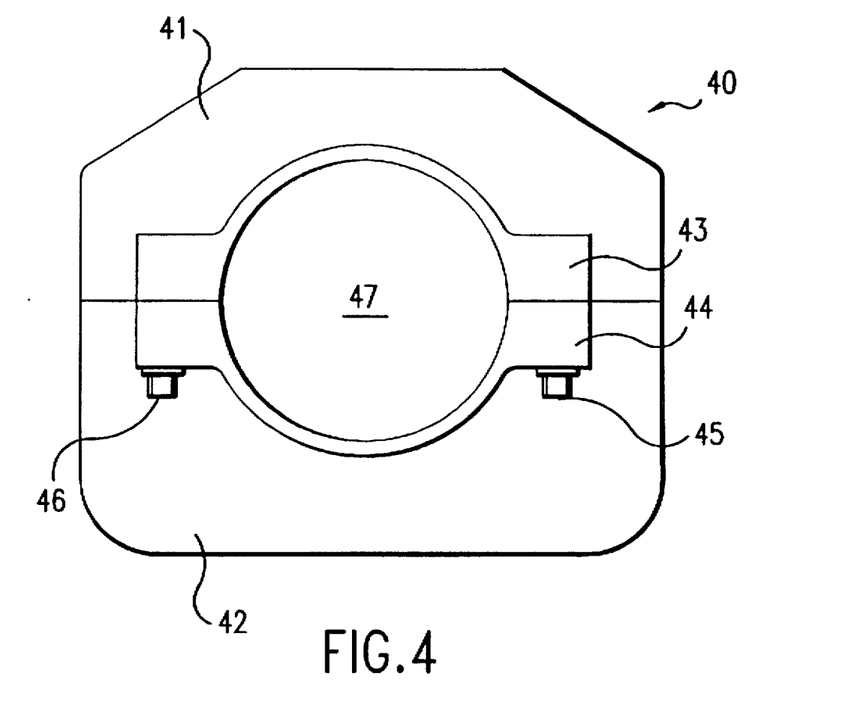
FIG. 4 is a top view of the viewer adaptor.
Figure 5:
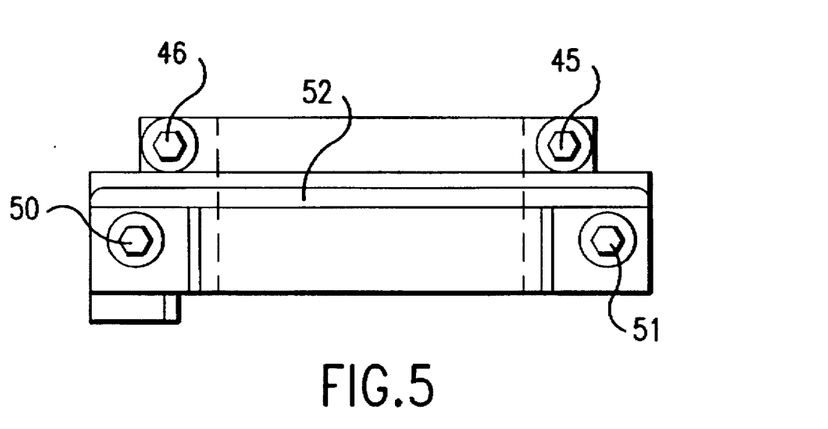
FIG. 5 is a rear view of the viewer adaptor shown in FIG. 4.

FIG. 4 is a top view of viewer adaptor 40 of the present invention. As shown in FIG. 4, viewer adaptor 40 includes two half sections 41 and 42 each which include integral raised sleeve portions 43 and 44 respectively. Each section is releasably held together with bolt/washer combinations 45, 46 and 50,51 of FIG. 5. When each section is mated, an opening 47 of FIG. 4 is formed. FIG. 5 is a bottom side view of the viewer adaptor shown in FIG. 4. As shown in FIG. 5, the viewer adaptor also includes bolt and washer combinations 50 and 51 on half section 42 of FIG. 4. Bolt and washer combinations 50 and 51 provide additional clamping force to that already provided by bolt and washer combinations 45 and 46. Latching surface flange 52 which extends outward from half section 42 of FIG. 4, provides a surface upon which latch 101 will engage as described later.

Figure 6:
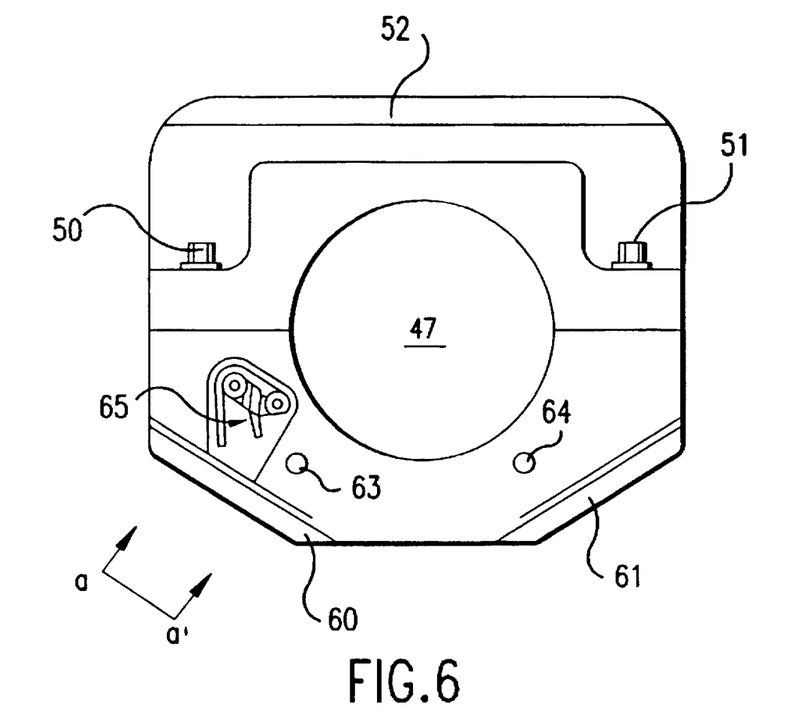
FIG. 6 is a bottom view of the viewer adaptor shown in FIG. 4.
Figure 7:
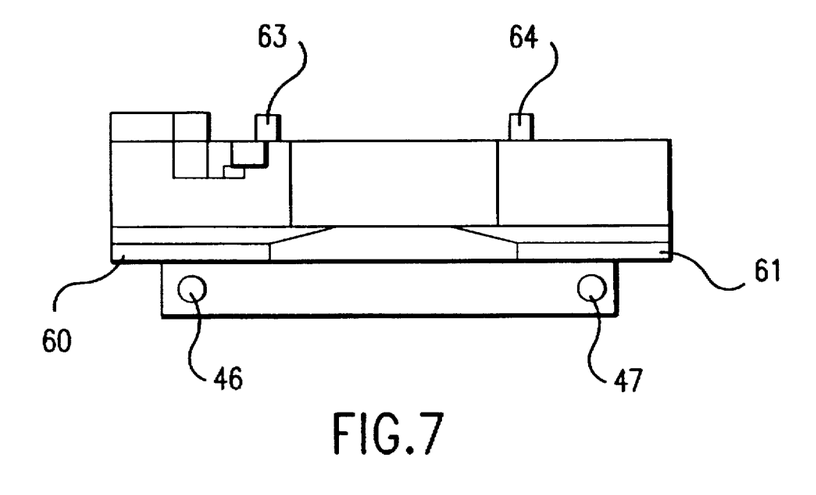
FIG. 7 is a front view of the viewer adaptor shown in FIG. 6.

FIG. 6 is a bottom view and FIG. 7 the front view, both of the viewer adaptor shown in FIG. 4. In FIG. 6 there is shown front support flanges 60 and 61 which provide support to the viewer adaptor when positioned within the hatch insert of FIGS. 1, 2 and 3. Front support flanges 60 and 61 of FIG. 4 are inserted within latching space 19 of FIG. 1 so as to provide both lateral and vertical stability to the viewer adaptor when positioned within the hatch insert. Latching surface 52 of FIG. 5 is at the same time positioned within depression 106 of FIG. 1 is also to provide additional lateral and vertical stability to the viewer adaptor when positioned within the hatch insert. Latching surface 52 which extends outward from the side of the adaptor is thus provided as the surface upon which latch 101 will bear upon when latch 101 is in the closed position. Azimuth limit stops 63 and 64 project upward from the viewer adaptor as shown in FIG. 7 to provide a limit of circular travel of the viewing device that projects outward of the hatch when the viewing device is positioned within the viewer adaptor. Roller assembly 65 is positioned within one side of the viewer adaptor with a biased movement against the surface of the viewing device collar located within opening 47.

The hatch opening in MX 113 vehicles already exist for previous non-thermal night vision sights. Of the many vehicles of this type it would be very costly to replace the hatch cover. The viewer adaptor is compatible with U.S. Army and U.S. Marine vehicles already fielded. The dimensions of the hatch insert and viewer adaptor is determined by the dimensions of the hatch opening.

Figure 8:
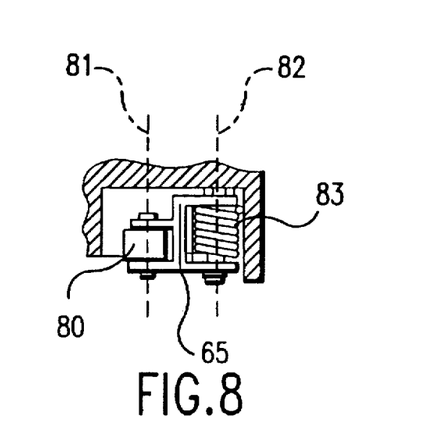
FIG. 8 is an enlarged top view of the roller assembly shown in FIG. 6.

FIG. 8 is an enlarged top view of roller assembly 65 shown in FIG. 6 viewed along line a—a'. Roller 80 rotatable about axis 81 is also in its entirety rotatable about a second axis 82 where the roller assembly is biased by spring 83. This allows roller 80 to bias against the surface of the viewing device collar which includes detentes about the collar surface, allowing the user to fix the viewing device in any one of several detent positions.

Figure 9:
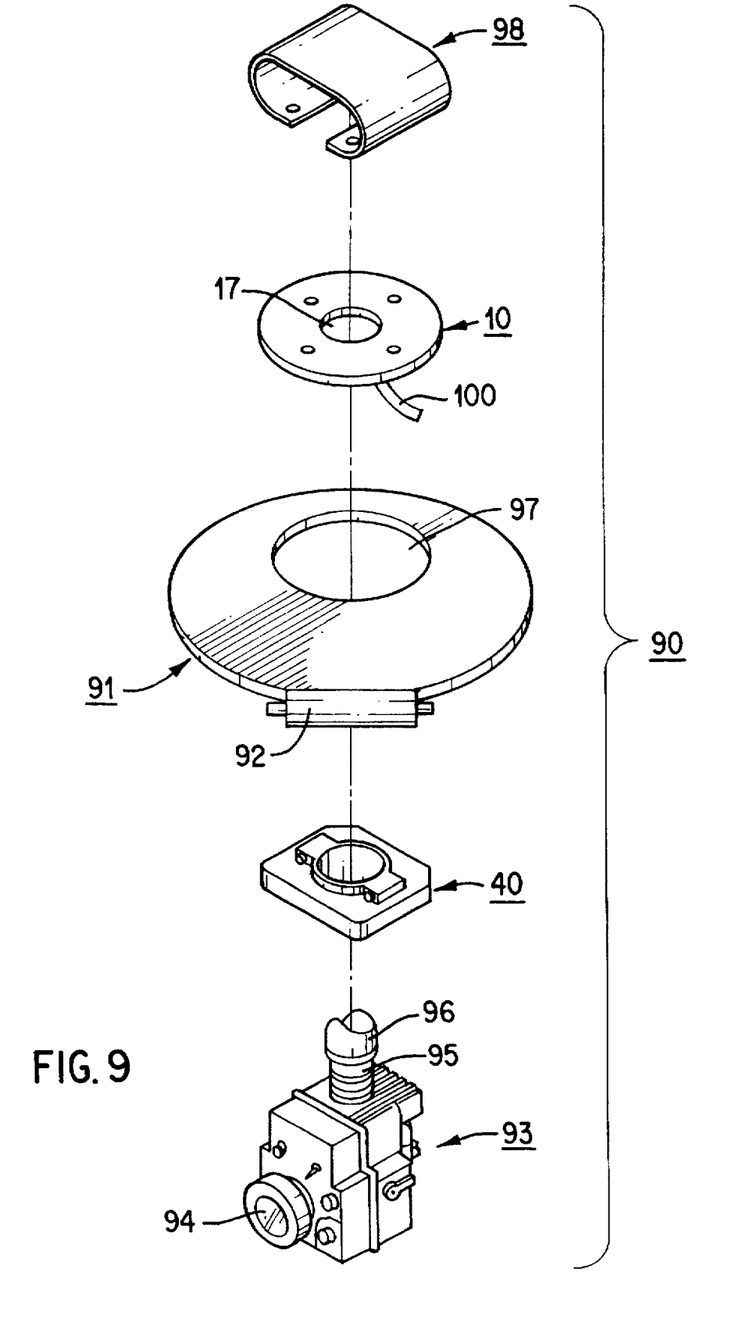
FIG. 9 is an exploded view of the overall mounting system utilized.

FIG. 9 is an exploded view of the mounting system 90 utilized in a vehicle that includes a hatch opening such as to a track vehicle. Vehicle hatch cover 91 is located on the outside of a vehicle, and hatch cover 91 pivots about hinge pivot 92 thereby allowing access to within the vehicle by the operator and other occupants. Viewing device 93 which includes a viewer's display 94 and a collar surface 95 above which is mounted periscope head assembly 96. Hatch insert 10 is then inserted within hatch opening 97.

Figure 10:
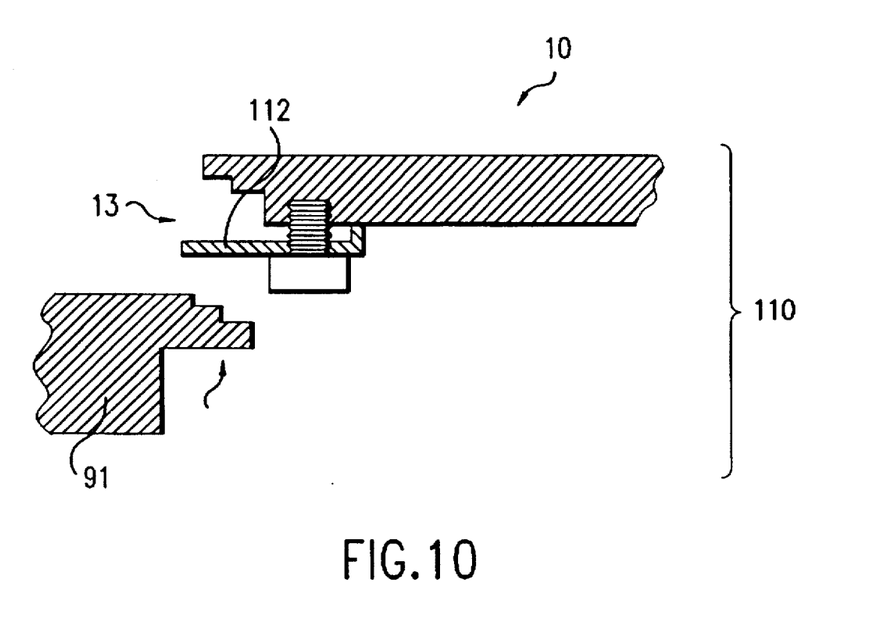
FIG. 10 is a partial exploded side cross-sectional view of the hatch insert of FIG. 1 with a hold down-clamp to be inserted into the corresponding receptive area in a hatch opening.

FIG. 10 shows a partial, exploded side cross-sectional view 110 of the mounting of hatch insert 10 of FIG. 1 to vehicle hatch cover 91 of FIG. 9. Each hold down-clamp in hatch insert 10 of FIG. 1 is inserted as described below for the specific hold-down clamp shown in FIG. 10. Hold down-clamp 13 bolted into the corresponding receptive area 111 in vehicle hatch cover 91. Extension 112 of hold-down clamp 13 captures the hatch and the tightness of the bolt determines the tightness of the insert.

Viewer adaptor 40 would be mounted about collar surface 95 so that viewing device 93 with viewer adaptor 40 attached is then mounted from below into opening 17. Handle 100 of FIG. 1 would then be rotated to lock viewer adaptor 40 into place and thus effecting a mounting of viewing device 93 rotatively underneath hatch 91. The operator, located within the vehicle would normally view the outside environment through display 94 while also rotating the entire viewing device about collar bearing surface 95. Ballistic shield 98 is mounted to hatch insert 10 at mounting holes 20 shown in FIG. 2. Since the viewing device occupies space that is normally used for entrance to and exit from the vehicle, the viewing device occupies "non-critical space. For the purposes of this patent, "critical" space is defined as the area within the confines of a vehicle needed for the operation of the vehicle, as example including (but not limited to): headroom, required space around existing equipment needed to operate said equipment, etc.

In the present embodiment shown, the invention provides a means to adapt presently fielded night vision drivers viewers such as the AN/VVS-2 light intensifier viewer and the AN/VAS-3 drivers thermal viewer into a vehicle for the purpose of driving these vehicles in reduced light, total darkness and through smoke and dust obscurants. A specific use disclosed would be utilizing the present invention to install the AN/VAS-3 Drivers thermal viewer into an XM 58 smoke dispensing vehicle so the diver may expel obscurant smoke while being engulfed in his own smoke, thereby providing his protection on the battlefield in both daylight and total darkness.

While this invention has been described in terms of preferred embodiments disclosed, those skilled in the art will recognize that the invention can be practiced with modification within the spirit and scope of the appended claims.

Having thus described my invention, what I claim as new and desire to secure by Letters Patent is as follows:

1. An assembly that allows a drivers thermal viewer to be releasably mounted therethrough a non-circular opening in a vehicle hatch cover, including:

a viewer adaptor releasably and rotatively coupled about a collar bearing surface of the drivers thermal viewer;

a hatch insert releasably coupled within the non-circular opening of the hatch cover, the hatch insert also including a non-circular opening for releasably coupling the viewer adaptor therewithin, so that when the viewer adaptor is coupled about the collar bearing surface, and releasably coupled within the hatch insert that has been releasably coupled within the hatch cover opening, there results in allowing a substantially unobstructed field of view, with the drivers thermal viewer within the vehicle rotatable from inside the vehicle.

2. A hatch insert for releasably coupling a viewer adaptor within an opening of a vehicle hatch cover, including:

a circular outer periphery which approximates the periphery of the opening in the vehicle hatch cover;

a non-circular inner periphery which approximates the periphery of a viewing device adaptor;

means for releasably coupling the circular outer periphery to the periphery of the vehicle hatch opening;

means for positionally stabilizing the viewer device adaptor within the inner periphery;

means for releasably coupling the viewer device adaptor to the inner periphery, thereby allowing a viewer adaptor to be releasably coupled and positionally set within the inner periphery of the hatch insert.

3. A viewer adaptor, for releasably coupling a drivers thermal viewer which includes a collar bearing surface, therethrough a hatch insert, where the hatch insert is positioned within an opening of a vehicle hatch cover, the viewer adaptor including:

two half sections, each section semi-circular shaped;

means for releasably coupling the two half sections, thereby allowing the two half sections to be releasably coupled about the collar bearing surface of the drivers thermal viewer, and when the viewer adaptor is coupled, the drivers thermal viewer is rotatable about the collar bearing surface when the viewer adaptor is coupled to the hatch insert.

* * * * *